United States Patent
Ji et al.

(10) Patent No.: US 6,625,134 B1
(45) Date of Patent: Sep. 23, 2003

(54) SYSTEM AND METHOD FOR REALLOCATING A TRAFFIC CHANNEL IN SOFT HANDOFF STATE

(75) Inventors: Li Ji, Plano, TX (US); Steven E. Lovette, Keller, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/188,994

(22) Filed: Nov. 9, 1998

(51) Int. Cl.[7] .................................................. H04Q 7/00
(52) U.S. Cl. ........................................ 370/331; 455/437
(58) Field of Search ................................. 370/520, 322, 370/328, 329, 330, 331, 332, 333, 334, 335, 342; 455/436, 437, 439, 442

(56) References Cited

U.S. PATENT DOCUMENTS

| | | | | |
|---|---|---|---|---|
| 5,287,544 A | * | 2/1994 | Menich et al. | 455/422 |
| 5,465,389 A | * | 11/1995 | Agrawal et al. | 455/437 |
| 5,640,679 A | * | 6/1997 | Lundqvist et al. | 455/525 |
| 5,673,259 A | * | 9/1997 | Quick, Jr. | 370/342 |
| 5,794,149 A | * | 8/1998 | Hoo | 455/438 |
| 5,956,641 A | * | 9/1999 | Bruckert et al. | 455/442 |
| 6,021,123 A | * | 2/2000 | Mimura | 370/331 |
| 6,064,883 A | * | 5/2000 | Smith | 455/428 |
| 6,069,883 A | * | 5/2000 | Ejzak et al. | 370/335 |
| 6,163,696 A | * | 12/2000 | Bi et al. | 455/436 |
| 6,216,004 B1 | * | 4/2001 | Tiedemann, Jr. et al. | 455/442 |

* cited by examiner

Primary Examiner—Kwang Bin Yao

(57) ABSTRACT

There is disclosed, for use in a CDMA wireless network, a channel resource allocator for reallocating a data traffic channel in a soft handoff state to handle incoming calls from new mobile stations. The channel resource allocator includes an overhead channel controller for reconfiguring a data traffic channel as an overhead channel upon failure of an overhead channel element in a base transceiver station (BTS). The channel resource allocator determines if all data traffic channels of the BTS are in use. If so, the channel resource allocator determines whether any of the existing calls being serviced by the data traffic channels are in a soft handoff state in which the call is connected simultaneously to two or more base transceiver stations. If so, the channel resource allocator drops the connection to the BTS in which the overhead channel failure occurred, thereby freeing up the data traffic channel. The overhead channel controller may then reconfigure the dropped data traffic channel as an overhead channel, or the channel resource allocator may reallocate the dropped data traffic channel to handle a new incoming call from a mobile station.

20 Claims, 4 Drawing Sheets

SYSTEM AND METHOD FOR REALLOCATING A TRAFFIC CHANNEL IN SOFT HANDOFF STATE

TECHNICAL FIELD OF THE INVENTION

The present invention is directed, in general, to CDMA wireless networks and, more specifically, to a system for reallocating a traffic channel in a soft handoff state as an overhead control channel or as a traffic channel for another mobile station.

BACKGROUND OF THE INVENTION

Reliable predictions indicate that there will be over 300 million cellular telephone customers by the year 2000. Within the United States, cellular service is offered not only by dedicated cellular service providers, but also by the regional Bell companies, such as U.S. West, Bell Atlantic and Southwestern Bell, and the national long distance companies, such as AT&T and Sprint. The enhanced competition has driven the price of cellular service down to the point where it is affordable to a large segment of the population.

Wireless subscribers use a wide variety of wireless devices, including cellular phones, personal communication services (PCS) devices, and wireless modem-equipped personal computer (PCs), among others. The large number of subscribers and the many applications for wireless communications have created a heavy subscriber demand for RF bandwidth. To maximize usage of the available bandwidth, a number of multiple access technologies have been implemented to allow more than one subscriber to communicate simultaneously with each base transceiver station (BTS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

Although TDMA-based wireless networks were developed on a large scale first, CDMA-based wireless networks are now also widely used. CDMA systems divide the RF spectrum into a number of wideband digital radio signals. Each digital radio signal carries several different coded "channels". Each coded channel is distinguished by a unique pseudo-random noise (PN) code used by the mobile station and/or the base station. In a CDMA receiver, the coded channels are decoded by a signal correlator that matches PN sequences.

Some coded channels are used as data traffic channels to transport subscriber voice and/or data signals, while other coded channels are used as control, or "overhead," channels, including Pilot, Synchronization, Paging and Access channels. In some systems, one or more of the Pilot, Synchronization, Paging and Access channels may be combined into a single channel.

When a mobile station accesses a base station in a CDMA wireless network via the overhead channels (each of which has a unique PN code), the network assigns the mobile station to a data traffic channel (which has a different PN code than the overhead channels) on which the mobile station exchanges voice or data traffic with another party (including another mobile station), a data terminal, a fax machine, or the like. Typically, the coded overhead channels and the coded data traffic channels used by the mobile station and the base station are on the same RF carrier frequency. Advantageously, in many CDMA networks, the overhead channels and the data traffic channels are on the same RF carrier frequency in all cells (i.e., base station coverage areas) in the networks.

Each data traffic channel and overhead control channel of a base transceiver station constitutes a "resource" of that base transceiver station. Ultimately, the channel resources of a base transceiver station are limited by the practical restraints imposed by the hardware in the base transceiver station. Thus, a base transceiver station is limited to servicing a certain number of data traffic channels at any one time. This limit is usually determined by the number of channel transmitter/receiver elements that are built into the BTS. If a BTS contains fifty (50) channel transceiver elements that are reserved for data traffic channels, then the BTS is limited to handling a maximum of 50 two-way communication links with 50 mobile stations. If a fifty-first mobile station tries to access the base transceiver station via its access channel, the base transceiver station will refuse the access request until one of the fifty data traffic channels becomes free.

The limitations on the number of data traffic channels served by a base transceiver station also affect the failure recovery capabilities of a base transceiver station. If a hardware or software failure occurs in a base transceiver station, an overhead channel can be lost (i.e., transmission failure) within the corresponding cell site. If the failure occurs on the Paging, Synchronization, or Access channels, the existing calls within the cell site are not lost. However, the failed base transceiver station (BTS) becomes inaccessible and no new calls can be established. If the Pilot channel is lost, not only will the BTS become inaccessible, but all existing calls are dropped within a period of only a few seconds.

To deal with the failure of an overhead channel, conventional wireless systems initiate an overhead channel switchover operation. When a switchover occurs, the BTS reconfigures an unused data traffic channel to operate as an overhead channel by using the same PN code and frequency range used by the failed overhead channel. This is an adequate solution provided that the BTS is not operating at full capacity, such that all data traffic channels are already in use. If no data traffic channel is available, the BTS drops an established call in order to free up a data traffic channel that can be reconfigured as an overhead channel. This is done even if the dropped call is a "911" emergency call or an important business or personal call. In any event, the dropped call is a loss for the consumer and the service provider.

To overcome the problems associated with dropping an established call in order to reconfigure an overhead channel, conventional wireless systems sometimes reserve a "hot" standby channel element for each overhead channel. Unfortunately, this results in a loss of, for example, two to four data traffic channels, depending on how many overhead channels are used to carry the Pilot, Synchronization, Paging and Access signals.

For example, if the Pilot, Synchronization, Paging and Access signals are carried in four separate channels, four standby channels are needed and four data traffic channels are lost. If the Pilot and Paging signals are carried in separate overhead channels and the Synchronization and Access channels are combined in the same overhead channel, then three standby overhead channels ad are needed and three data traffic channels are lost.

There is therefore a need in the art for a CDMA wireless network that more efficiently utilizes the channel resources of the base transceiver stations in the network in order to serve the greatest number of mobile stations possible. There is also a need for a CDMA wireless network that suffers minimal performance degradation upon the occurrence of a failure in an overhead channel. In particular, there is a need for a CDMA wireless network that minimizes the risk of dropping an existing call in order to reconfigure a data traffic channel as an overhead channel. More particularly, there is a need for a CDMA wireless network that minimizes the risk of dropping an existing call in order to reconfigure a data traffic channel and which eliminates or reduces the need for standby channels.

SUMMARY OF THE INVENTION

To address the above-discussed deficiencies of the prior art, it is a primary object of the present invention to provide, for use in a CDMA wireless network, a channel resource allocator for reallocating a data traffic channel in a soft handoff state to handle incoming calls from new mobile stations. The present invention further includes an overhead channel controller for reconfiguring an overhead channel upon an overhead channel failure in a base transceiver station (BTS). The channel resource allocator determines whether or not all data traffic channels of the BTS are in use. If all data traffic channels are in use, the channel resource allocator determines whether any of the existing calls being serviced by the data traffic channels are in a soft handoff state in which the call is connected simultaneously to two or more base transceiver stations. If so, the channel resource allocator drops the connection to the BTS in which the overhead channel failure occurred, thereby freeing up the data traffic channel. The overhead channel controller may then reconfigure the dropped data traffic channel as an overhead channel, or the channel resource allocator may reallocate the dropped data traffic channel to handle a new incoming call from a mobile station.

If more than one existing call is in a soft handoff state, the channel resource allocator drops the connection that receives the weakest reverse channel signal from the mobile station. Additionally, the channel resource allocator distinguishes between a "soft" handoff connection between a first BTS and a second BTS and "softer" handoff connection between separate sector antennas in the same BTS. The channel resource allocator drops soft handoff connections but not softer handoff connections. Furthermore, in one embodiment of the present invention, the channel resource allocator may also distinguish between an "emergency" call and a "non-emergency call" in determining which one(s) of two or more soft handoff calls to drop in order to reconfigure an overhead channel.

Accordingly, there is provided, in one embodiment of the present invention, for use in a wireless network comprising a plurality of base transceiver stations, each of the base transceiver stations capable of establishing and maintaining communication links with a plurality of a mobile stations by means of at least one overhead channel and a plurality of data traffic channels, an apparatus for allocating the plurality of data traffic channels comprising 1) at least one of: a) a failure detection circuit capable of detecting a failure in the at least one overhead channel of a first base transceiver station and generating a failure notification; and an access request detection circuit capable of, detecting an access request message received from an accessing one of the plurality of mobile stations and generating an access request notification; and 2) a channel allocator capable of receiving at least one of the failure notification and the access request notification and, in response thereto, terminating a first communication link between the first base transceiver station and a first selected one of the plurality of mobile stations, wherein the first selected mobile station maintains at least a second communication link with at least a second base transceiver station, and at least one of: a) reconfiguring a first data traffic channel associated with the terminated first communication link as a replacement overhead control channel replacing the failed overhead control channel and b) allocating the first data traffic channel associated with the terminated first communication link to establish a communication link with the accessing mobile station.

According to another embodiment of the present invention, the channel allocator is capable of determining if one of the plurality of data traffic channels associated with the first base transceiver station is unused prior to terminating the first communication link between the first base transceiver station and the first selected mobile station.

According to still another embodiment of the present invention, the channel allocator reconfigures an unused one of the plurality of data traffic channels associated with the first base transceiver station as the replacement overhead control channel in lieu of terminating the first communication link and reconfiguring the first data traffic channel associated with the terminated first communication link.

According to still another embodiment of the present invention, the channel allocator allocates an unused one of said plurality of data traffic channels associated with said first base transceiver station to establish a communication link with said accessing mobile station in lieu of terminating said first communication link and allocating said first data traffic channel associated with said terminated first communication link to establish a communication link with said accessing mobile station.

According to yet another embodiment of the present invention, the channel allocator further comprises a memory coupled to the overhead channel controller, wherein the memory is capable of storing status data associated with the first communication link.

According to a further embodiment of the present invention, the status data comprises a received signal strength indicator associated with the first communication link.

According to a still further embodiment of the present invention, the status data comprises handoff state data, wherein the handoff state data indicates whether the first selected mobile station associated with the first communication link maintains the at least a second communication link with the at least a second base transceiver station.

According to a yet further embodiment of the present invention, the handoff state data indicates a total number of communication links the first selected mobile station maintains with other ones of the plurality of base transceiver stations.

In yet another embodiment of the present invention, the status data further comprises a first received signal strength indicator associated with the first communication link and the overhead channel controller terminates the first communication link with the first selected mobile station if the first received signal strength indicator indicates that a signal associated with the first communication link is weaker that a second signal associated with a second communication link between the first base transceiver station and a second selected one of the plurality of mobile stations.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged CDMA wireless network.

Figure 1:
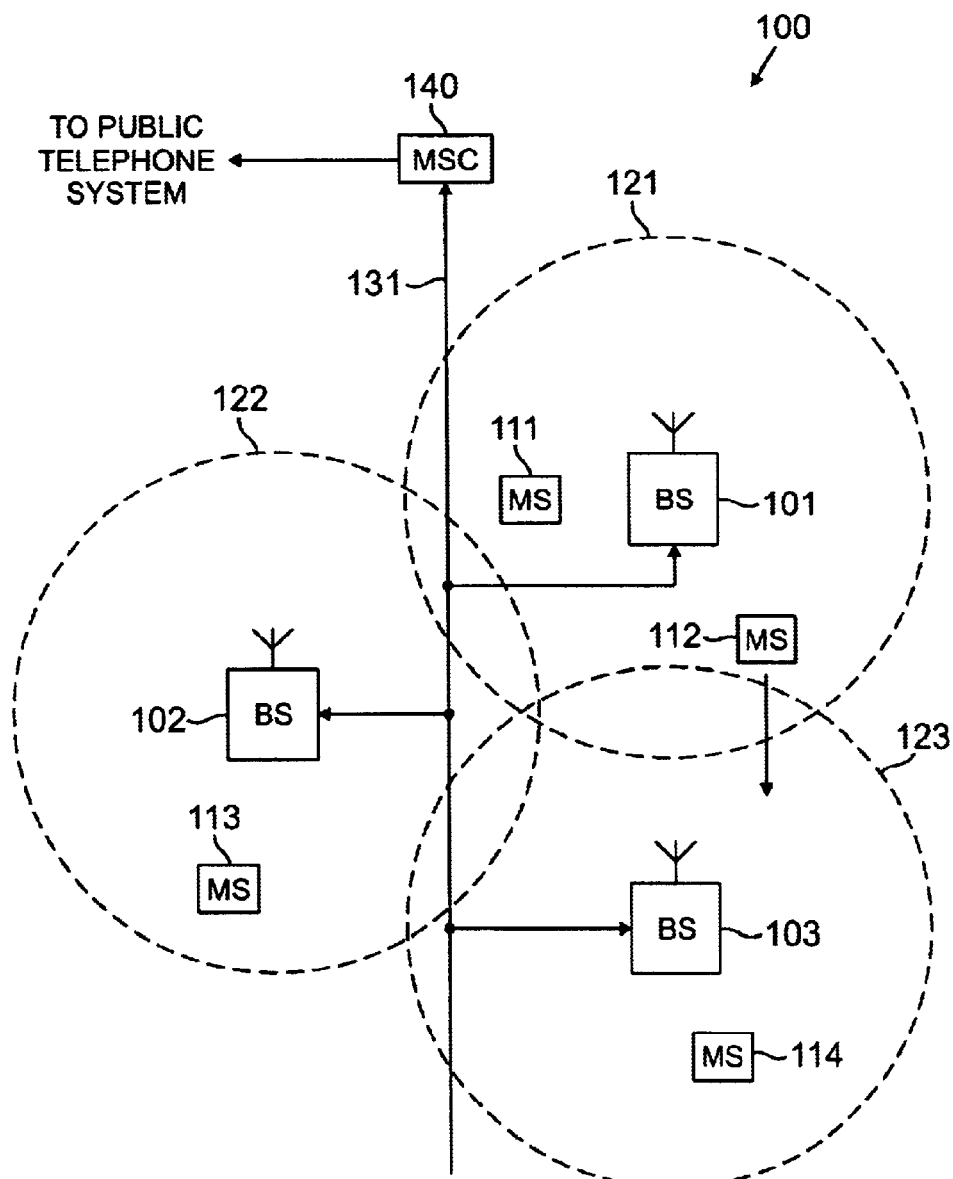
FIG. 1 illustrates an exemplary CDMA wireless network according to one embodiment of the present invention.

FIG. 1 illustrates an exemplary CDMA wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cells sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Communications line 131 may be any suitable connection means, including a T1 line, a T3 line, a fiber optic link, a network backbone connection, and the like. Mobile switching center 140 is well known to those skilled in the art. Mobile switching center 140 is a switching device that provides services and coordination between the subscribers in a wireless network and external networks, such as the public telephone system. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. The MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

A handoff transfers control of a call from a first cell to a second cell. For example, if MS 112 is in communication with BS 101 and senses that the signal from BS 101 is becoming weak, MS 112 may then switch to a base station that has a stronger signal, such as the signal transmitted by BS 103. MS 112 and BS 103 may then establish a new communication link and a signal is sent to BS 101 and the public telephone network to transfer the ongoing voice, data, or control signals through BS 103. The call is thereby seamlessly transferred from BS 101 to BS 103. An "idle" handoff is a handoff between cells of a mobile device that is communicating in an overhead channel, rather than transmitting voice and/or data signals in the regular traffic channels.

Because adjoining base stations in a CDMA network are operating on the same RF carrier frequency, each of MS 111–114 station can simultaneously access two or more of BS 101–103 by using the same PN codes to communicate in data traffic channels and overhead channels with each base station. This enables a "soft" handoff to occur because a mobile station can establish a second communication link (or "leg") with a second base station while still communicating on a first leg with a first base station.

Advantageously, neither a mobile unit nor a wireless network must immediately sever a first communication link once a subsequent communication link has been established during a handoff operation. Thus, if the mobile station is within range of two or more base stations, it is possible for the mobile station to maintain multiple "legs," each with a different base station, for a prolonged period of time.

The present invention takes advantage of the fact that, if a BTS has no traffic channels available when a new mobile station tries to access the BTS or when a failure occurs in an overhead channel, there still is probably at least one traffic channel in the BTS that is servicing an existing call that is in a soft handoff state. The BTS can safely drop the call connection in the traffic channel that is being used as one of several soft handoff legs by the existing mobile station, because the existing mobile station is still be connected to at least one BTS by another soft handoff leg.

The present invention comprises a channel resource allocator for reallocating (or reassigning) a data traffic channel that is in soft hand state. The present invention further comprises an overhead channel controller for reconfiguring a data traffic channel as an overhead channel upon an overhead channel failure in a base transceiver station (BTS). If a new mobile station tries to access the BTS, or if an overhead channel fails, the channel resource allocator determines whether or not all of the data traffic channels of the BTS are in use. If all data traffic channels are in use, the channel resource allocator determines whether any of the existing calls being serviced by the data traffic channels are in a soft handoff state to two or more base transceiver stations. If so, the channel resource allocator drops one of these soft handoff connections to the BTS, thereby freeing up the corresponding data traffic channel. If an overhead channel failure occurred, the overhead channel controller reconfigures the newly freed data traffic channel to replace the failed overhead channel. If a new mobile station is attempting to access the base transceiver station, the channel resource allocator assigns the newly freed data traffic channel to the new mobile station.

Figure 2:
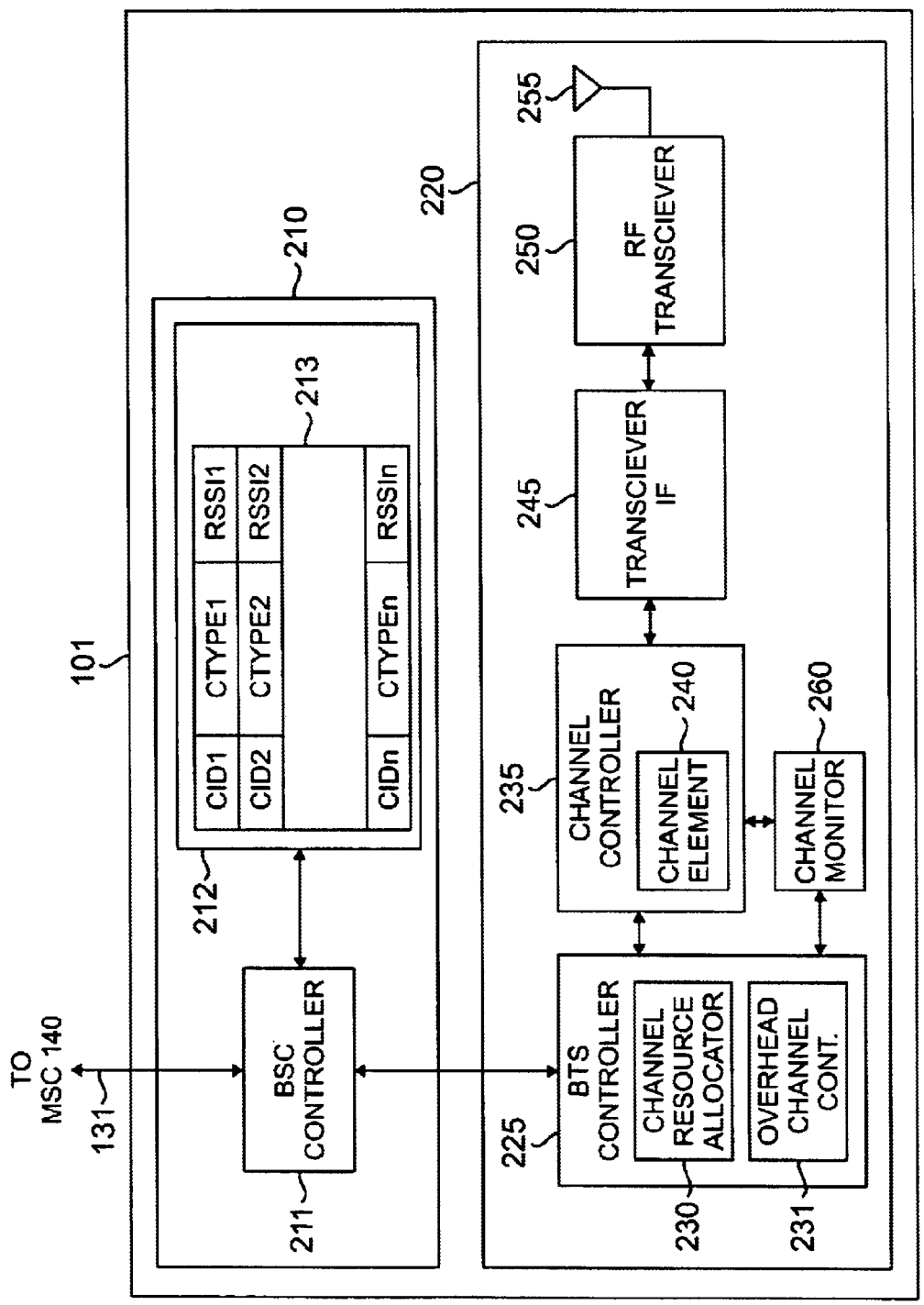
FIG. 2 illustrates a channel resource allocator in base station according to one embodiment of the present invention.

FIG. 2 illustrates channel resource allocator 230 and overhead channel controller 230 in base station 101 according to one embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 120 comprises BTS controller 225, which contains channel resource allocator 230 and overhead channel controller 231 in accordance with the principles of the present invention. BTS 120 also comprises a channel controller 235, which contains representative channel element 240, transceiver interface (IF) 245, RF transceiver unit 250, antenna array 255, and channel monitor 260.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. The channel elements operate according to a code division multiple access (CDMA) protocol with the mobile stations in cell 121. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is multi-sector antenna, such as a three sector antenna in which each antenna sector is responsible for transmitting and receiving in a 120° arc of coverage area. Additionally, transceiver 250 may contain an antenna selection unit to select among different antennas in antenna array 255 during both transmit and receive operations.

BSC 210 comprises BSC controller 211 and memory 212, which contains channel selection table 213. Channel selection table 213 stores information related to each of the "N" overhead and traffic channels in BTS 220 in a plurality of data fields, including a channel identifier field (i.e., CID1 through CIDn), a channel type field (i.e., CTYPE1 through CTYPEn), and a received signal strength indicator field (i.e., RSSI1 through RSSIn), among others. Each of CID1–CIDn comprises a unique identifier that identifies each channel element in channel controller 235. Each of CTYPE1–CTYPEn comprises a plurality of sub-fields for storing configuration and status information about a corresponding one of CID1–CIDn. Each of RSSI1–RSSIn contains a value that indicates the relative strength of the signal being received in a corresponding channel.

For example, the value in CID2 may identify an overhead channel that is being handled by channel element 240. CTYPE2 may contain a first sub-field indicating that CID2 is a traffic channel, a second sub-field indicating that the traffic channel identified by CID2 is (or is not) a soft handoff leg to a mobile station that is in a soft handoff state, and a third sub-field indicating whether the soft handoff leg corresponds to a mobile station in a soft handoff state (i.e., handoff from a first BTS to a second BTS) or in a softer handoff state (i.e., handoff from a first antenna sector to a second antenna sector within the same BTS). CTYPE2 may contain a fourth sub-field indicating how many other soft handoff legs are used by the mobile station, and which other base stations are handling the other soft handoff legs. Finally, RSSI2 may contain a value indicating the relative strength of the signal received in the channel identified by CID2. RSSI2 may be measured directly by, for example, channel monitor 260, or may be determined indirectly by monitoring the strength of the forward channel.

Much of the information stored in channel selection table 213 is received from BTS 220. However, some of the information stored in channel selection table 213, such as information about other soft handoff legs, may be received from external sources, such as from other base transceiver stations controlled by BSC 210. The externally received information may also be received from other base station receivers via MSC 140 and communications link 131.

Figure 3:
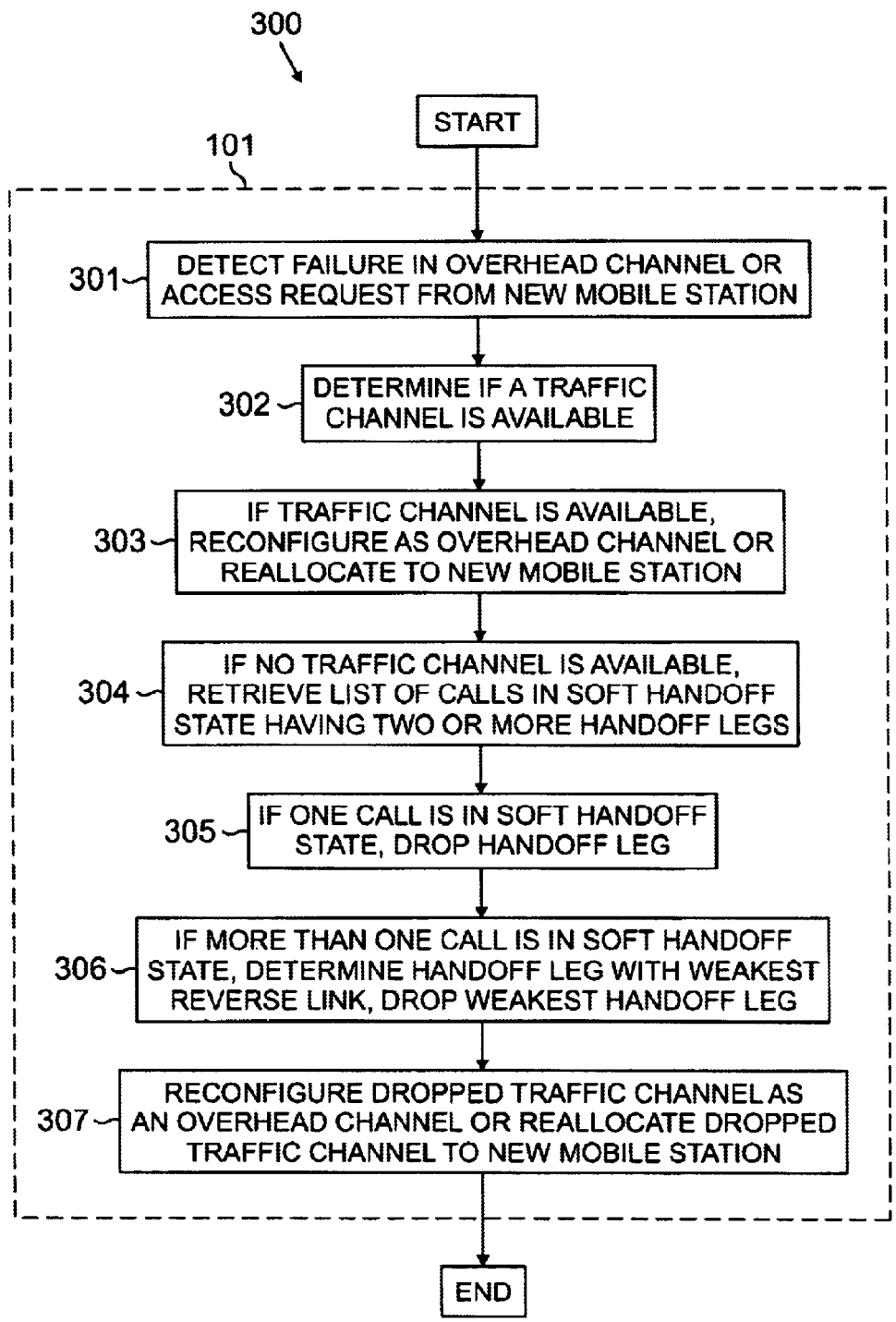
FIG. 3 illustrates a flow diagram illustrating the operation of an overhead channel controller in a base station according to one embodiment of the present invention.

FIG. 3 illustrates a flow diagram 400 illustrating the operation of channel resource allocator 230 and overhead channel controller 231 in base station 101 according to one embodiment of the present invention. Under normal operations, forward and reverse channel signals are processed by the N channel elements under control of channel controller 235. However, at some point in time, a new mobile station may attempt to access base station 101 when no additional traffic channels are available. Alternatively, an overhead channel may fail and the failure is subsequently detected in base station 101 by channel monitor 260 (process step 301).

If a new mobile station attempts to access base station 101, channel controller 235 detects the corresponding access request message from the channel element that is handling the access channel and notifies channel resource allocator 230 of the access request. Alternatively, if a failure occurred, channel monitor 260 notifies channel resource allocator 230 and overhead channel controller 231 of the failure. Channel resource allocator 230 then determines if a data traffic channel is available (process step 302). Channel resource allocator 230 determines whether a data traffic channel is available by requesting channel status information from channel controller 235, which responds by identifying inactive channel elements. Alternatively, channel resource allocator 230 may make this determination by requesting channel status information from BSC controller 211, which checks the contents of channel selection table 213 to determine if any data traffic channels are not in use.

If one or more data traffic channels are available and a new mobile station is attempting to access base station 101, channel resource allocator 230 selects one of the available data traffic channels and sends a command to channel controller 235 that causes channel controller 235 to assign one of its channel elements to the call from the new mobile station. If one or more traffic channels are available and an overhead channel failure has occurred, channel resource allocator 230 selects one of the available data traffic channels and sends a command to overhead channel controller 231, which reconfigures one of the available channel elements in channel controller 235 as the failed overhead channel (process step 303).

If no traffic channel is available, channel resource allocator 230 retrieves from BSC controller 211 a list of traffic channels in BTS 220 that are serving calls that are in soft handoff states and that have already established two or more soft handoff legs (process step 304). BSC controller 211 determines this information from channel selection table 213.

If only one traffic channel forms a soft handoff leg for a mobile station that is in a soft handoff state, then that soft handoff leg is dropped (process step 305). If more than one traffic channel forms a soft handoff leg for a mobile station that is in a soft handoff state, then channel resource allocator 230 examines the corresponding RSSI data of each such soft handoff leg and determines which soft handoff leg has the weakest received signal in the reverse channel. The weakest soft handoff leg is then dropped (process step 306).

In one embodiment of the present invention, channel resource allocator 230 determines which soft handoff leg is weakest by determining which forward channel signal transmitted by BTS 220 to the soft handoff mobile station is strongest. Generally, the stronger the forward channel signal used to communicate with a mobile station, the farther away the mobile station is and the weaker its reverse channel signal is. Additionally, it is more likely that the most remote mobile station is receiving a strong forward channel signal in another soft handoff leg from another base station, thereby minimizing the risk that the call will be dropped completely.

If a new mobile station is attempting to access base station 101, channel resource allocator 230 sends a command to channel controller 235 that causes channel controller 235 to reassign/reallocate the channel element that handled the dropped handoff leg to now handle the call from the new mobile station. Alternatively, if an overhead channel failure occurred, channel resource allocator 230 sends a command to overhead channel controller 231, which reconfigures the traffic channel element for the dropped handoff leg to replace the failed overhead channel (process step 307). At this point, the mobile station that is in soft handoff is communicating with wireless network 100 via one or more other soft handoff legs to other base transceiver stations.

Figure 4:
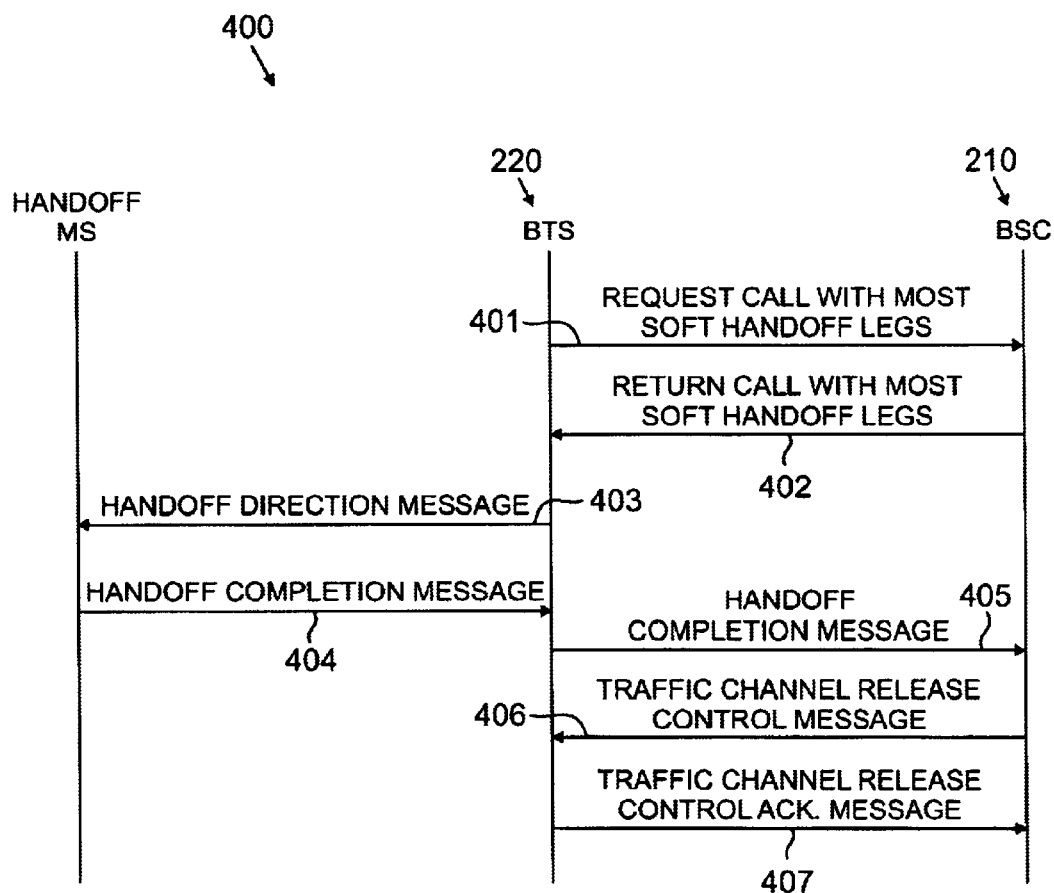
FIG. 4 illustrates an exemplary message flow diagram in a wireless network according to one embodiment of the present invention.

FIG. 4 illustrates an exemplary message flow diagram 400 in wireless network 100 according to one embodiment of the present invention. After a failure in the overhead channel is detected or an access request message is received when no data traffic channels are available, base transceiver station 220 transmits a Request Message to base station controller 210 requesting BSC 210 to identify those calls that are being handled by a traffic channel in BTS 220 that have the most soft handoff legs (message 401). BSC 210 responds with a Response Message that returns identification data identifying the call(s) with the most soft handoff legs (message 402).

Next, BTS 220 transmits a Handoff Direction Message to the mobile station (labeled "handoff MS") associated with the call identified by BSC 210 (message 403). The handoff mobile station then transmits a Handoff Completion Message to BTS 220 indicating that the handoff mobile station is dropping the call (message 404). BTS 220 relays the Handoff Completion Message to BSC 210 (message 405). Since the traffic channel previously used by the handoff mobile station is now available, BSC 210 transmits a Traffic Channel Release Control Message to BTS 220 (message 406). In response, BTS 220 transmits a Traffic Channel Release Control Acknowledgment Message to BSC 210 (message 407).

Although the present invention has been described in detail, those skilled in the art should understand that they can make various changes, substitutions and alterations herein without departing from the spirit and scope of the invention in its broadest form.

What is claimed is:

1. For use in a wireless network comprising a plurality of base transceiver stations, each of said base transceiver stations capable of establishing and maintaining communication links with a plurality of a mobile stations by means of at least one overhead channel and a plurality of data traffic channels, an apparatus for allocating said plurality of data traffic channels comprising:

at least one of:
 a failure detection circuit capable of detecting a failure in said at least one overhead channel of a first base transceiver station and generating a failure notification; and
 an access request detection circuit capable of detecting an access request message received from an accessing one of said plurality of mobile stations and generating an access request notification; and
a channel allocator capable of receiving at least one of said failure notification and said access request notification and, in response thereto, terminating a first communication link between said first base transceiver station and a first selected one of said plurality of mobile stations, wherein said first selected mobile station maintains at least a second communication link with at least a second base transceiver station, and at least one of:

reconfiguring a first data traffic channel associated with said terminated first communication link as a replacement overhead channel replacing said failed overhead channel; and allocating said first data traffic channel associated with said terminated first communication link to establish a communication link with said accessing mobile station.

2. The apparatus set forth in claim 1 wherein said channel allocator is capable of determining if one of said plurality of data traffic channels associated with said first base transceiver station is unused prior to terminating said first communication link between said first base transceiver station and said first selected mobile station.

3. The apparatus set forth in claim 2 wherein said channel allocator reconfigures an unused one of said plurality of data traffic channels associated with said first base transceiver station as said replacement overhead channel in lieu of terminating said first communication link and reconfiguring said first data traffic channel associated with said terminated first communication link.

4. The apparatus set forth in claim 2 wherein said channel allocator allocates an unused one of said plurality of data traffic channels associated with said first base transceiver station to establish a communication link with said accessing mobile station in lieu of terminating said first communication link and allocating said first data traffic channel associated with said terminated first communication link to establish a communication link with said accessing mobile station.

5. The apparatus set forth in claim 1 further comprising a memory coupled to said channel allocator, wherein said memory is capable of storing status data associated with said first communication link.

6. The apparatus set forth in claim 5 wherein said status data comprises a received signal strength indicator associated with said first communication link.

7. The apparatus set forth in claim 5 wherein said status data comprises handoff state data, wherein said handoff state data indicates whether said first selected mobile station associated with said first communication link maintains said at least a second communication link with said at least a second base transceiver station.

8. The apparatus set forth in claim 7 wherein said handoff state data indicates a total number of communication links said first selected mobile station maintains with other ones of said plurality of base transceiver stations.

9. A wireless network comprising:

a plurality of base transceiver stations, each of said base transceiver stations capable of establishing and maintaining communication links with a plurality of a mobile stations by means of at least one overhead channel and a plurality of data traffic channels; and at least one apparatus for allocating said plurality of data traffic channels comprising:

at least one of:

a failure detection circuit capable of detecting a failure in said at least one overhead channel of a first base transceiver station and generating a failure notification; and an access request detection circuit capable of detecting an access request message received from an accessing one of said plurality of mobile stations and generating an access request notification; and a channel allocator capable of receiving at least one of said failure notification and said access request notification and, in response thereto, terminating a first communication link between said first base transceiver station and a first selected one of said plurality of mobile stations, wherein said first selected mobile station maintains at least a second communication link with at least a second base transceiver station, and at least one of:

reconfiguring a first data traffic channel associated with said terminated first communication link as a replacement overhead channel replacing said failed overhead channel; and allocating said first data traffic channel associated with said terminated first communication link to establish a communication link with said accessing mobile station.

10. The wireless network set forth in claim 9 wherein said channel allocator is capable of determining if one of said plurality of data traffic channels associated with said first base transceiver station is unused prior to terminating said first communication link between said first base transceiver station and said first selected mobile station.

11. The wireless network set forth in claim 10 wherein said channel allocator reconfigures an unused one of said plurality of data traffic channels associated with said first base transceiver station as said replacement overhead channel in lieu of terminating said first communication link and reconfiguring said first data traffic channel associated with said terminated first communication link.

12. The apparatus set forth in claim 10 wherein said channel allocator allocates an unused one of said plurality of data traffic channels associated with said first base transceiver station to establish a communication link with said accessing mobile station in lieu of terminating said first communication link and allocating said first data traffic channel associated with said terminated first communication link to establish a communication link with said accessing mobile station.

13. The wireless network set forth in claim 9 wherein said apparatus further comprises a memory coupled to said overhead channel controller, wherein said memory is capable of storing status data associated with said first communication link.

14. The wireless network set forth in claim 13 wherein said status data comprises a received signal strength indicator associated with said first communication link.

15. The wireless network set forth in claim 9 wherein said status data comprises handoff state data, wherein said handoff state data indicates whether said first selected mobile station associated with said first communication link maintains said at least a second communication link with said at least a second base transceiver station.

16. The wireless network set forth in claim 15 wherein said handoff state data indicates a total number of communication links said first selected mobile station maintains with other ones of said plurality of base transceiver stations.

17. For use in a wireless network comprising a plurality of base transceiver stations, each of the base transceiver stations capable of establishing and maintaining communication links with a plurality of a mobile stations by means of at least one overhead channel and a plurality of data traffic channels, a method for allocating the plurality of data traffic channels comprising the steps of:

at least one of:
  detecting a failure in the at least one overhead channel of a first base transceiver station;
  detecting an access request message received from an accessing one of said plurality of mobile stations; and
in response to at least one of the failure detection and the access request message detection, terminating a first communication link between the first base transceiver station and a first selected one of the plurality of mobile stations, wherein the first selected mobile station maintains at least a second communication link with at least a second base transceiver station; and
at least one of:
  reconfiguring a first data traffic channel associated with the terminated first communication link as a replacement overhead channel replacing the failed overhead channel; and
  allocating the first data traffic channel associated with the terminated first communication link to establish a communication link with the accessing mobile station.

18. The method set forth in claim 17 further comprising the step of determining if one of the plurality of data traffic channels associated with the first base transceiver station is unused prior to terminating the first communication link between the first base transceiver station and the first selected mobile station.

19. The method set forth in claim 18 further comprising the step of reconfiguring an unused one of the plurality of data traffic channels associated with the first base transceiver station as the replacement overhead channel in lieu of terminating the first communication link and reconfiguring the first data traffic channel associated with the terminated first communication link.

20. The method set forth in claim 17 further comprising the step of allocating an unused one of the plurality of data traffic channels associated with the first base transceiver station to establish a communication link with the accessing mobile station in lieu of terminating the first communication link and allocating the first data traffic channel associated with the terminated first communication link to establish a communication link with the accessing mobile station.

* * * * *